US005652374A

United States Patent [19]
Chia et al.

[11] Patent Number: 5,652,374
[45] Date of Patent: Jul. 29, 1997

[54] METHOD AND APPARATUS FOR DETECTING FAILURE IN VIBRATING SENSORS

[75] Inventors: Michael Ik-Ming Chia, Kokomo; Jack Daniel Johnson, Rossville, both of Ind.; Carl David Wright, Tucson, Ariz.

[73] Assignee: Delco Electronics Corp., Kokomo, Ind.

[21] Appl. No.: 500,217

[22] Filed: Jul. 10, 1995

[51] Int. Cl.$^6$ .................................. G01P 21/00
[52] U.S. Cl. .................. 73/1.38; 73/504.12; 73/514.29; 73/1.86
[58] Field of Search .................. 73/1 D, 1 DV, 73/504.12, 2, 1 B, 1 C, 504.13, 504.14, 504.15, 504.16, 504.04, 504.08, 504.09, 504.11, 504.18, 514.02, 514.15, 514.17, 514.29; 33/303, 317 D, 326, 356, 357, 358, 359, 1 E

[56] References Cited

U.S. PATENT DOCUMENTS

| | | | |
|---|---|---|---|
| 3,394,581 | 7/1968 | Johnson | 73/1 D |
| 3,401,549 | 9/1968 | Miller | 73/1 E |
| 3,657,918 | 4/1972 | Hurlbert | 73/1 D |
| 3,805,588 | 4/1974 | Stone | 73/1 E |
| 3,877,314 | 4/1975 | Bernin | 73/1 D |
| 4,176,555 | 12/1979 | Dorman | 73/1 DV X |
| 4,901,570 | 2/1990 | Chang et al. | 73/517 AV |
| 4,914,598 | 4/1990 | Krogmann et al. | 73/504.08 X |
| 5,004,985 | 4/1991 | Holroyd et al. | 73/1 DV X |
| 5,203,821 | 4/1993 | Tanaka | 73/1 D |
| 5,233,874 | 8/1993 | Putty et al. | 73/517 AV |
| 5,355,730 | 10/1994 | Koizumi | 73/1 D X |
| 5,383,362 | 1/1995 | Putty et al. | 73/505 |
| 5,450,751 | 9/1995 | Putty et al. | 73/505 |

FOREIGN PATENT DOCUMENTS 90864  4/1994  Japan .................. 73/1 D

OTHER PUBLICATIONS

Michael W. Putty et al., "A Micromachined Vibrating Ring Gyroscope," Solid State Sensor and Actuator Workshop, Jun. 1994, pp. 213–220.

Surface Micromachined Angular Rate Sensor—SAE Expo Feb. 27, 1995 Jack D. Johnson, et al SAE Technical Paper Series 950538, 2 cover pages+7 pages text.

*Primary Examiner*—Thomas P. Noland
*Attorney, Agent, or Firm*—Mark A. Navarre; Mary S. Moore

[57] ABSTRACT

A yaw sensor for automotive controls has a microstructure vibrating ring excited by a driving circuit. The driving circuit comprises an amplitude control loop which delivers voltage pulses at the resonant frequency of the ring. A compensation signal is derived from a comparison of a sensed vibration amplitude to a desired vibration amplitude. Failure of vibration is detected by comparing the compensation signal to a threshold which is higher than a normal compensation signal. Alternatively, vibration failure is detected by comparing the sensed vibration to a threshold lower than the desired vibration amplitude. Upon such failure, the yaw output signal is replaced by ground potential.

4 Claims, 2 Drawing Sheets

METHOD AND APPARATUS FOR DETECTING FAILURE IN VIBRATING SENSORS

FIELD OF THE INVENTION

This invention relates to motion sensors using vibrating sensing elements and particularly to a method and apparatus for detecting failure in such sensors.

BACKGROUND OF THE INVENTION

Miniature sensors such as gyroscopes useful for measuring or detecting movement or acceleration in particular have been fabricated by micromachining motion sensitive elements in integrated circuit chips. Such devices, based on vibrating mechanical elements which sense rotation, can be produced inexpensively by batch processing and yet yield performance suitable for many applications which require a low cost. One such application, for example, is the detection of yaw for sophisticated controls in automotive vehicles.

One sensor of this type incorporates a micromachined ring which is excited into vibration at its resonant frequency. The direction or orientation of vibration is somewhat dependent on rotation of the sensor so that the vibration can be analyzed to sense directional changes. An array of electrodes capacitively coupled to the ring are used to apply excitation energy and to sense the resulting vibration. A number of circuits are employed to excite the ring to resonance and to produce an output indicative of yaw or yaw rate.

Other types of motion sensors include other forms of vibrating elements such as tuning fork or vibrating shell configurations. The vibrating elements are not limited to microstructure devices but may be implemented as large scale devices as well. In any event, a failure in the vibrating element or in the excitation circuitry can lead to a loss of proper vibration. It is desirable to detect the occurrence of such a failure.

SUMMARY OF THE INVENTION

It is therefore an object of the invention to detect failure of vibration in a vibrating element motion sensor. Another object is to execute a failure warning in such a sensor inexpensively and simply. An additional object is to provide a failure warning without additional output circuitry.

A vibrating microstructure sensor of the type employed in the subject invention is disclosed in the following paper which is incorporated herein by reference: M. Putty and K. Najafi, "A Micromachined Vibrating Ring Gyroscope," Solid-State Sensors and Actuators Workshop, June 13–16, p213–220, (1994). A nickel ring formed in a silicon chip is supported on a central hub by a number of semicircular springs, and a plurality of electrodes on the chip surround the ring, spaced by a gap, to provide capacitive coupling to the ring. An excitation circuit connected to some of the electrodes drives the ring to vibration. The mode of vibration is to squeeze the ring into a first ellipse and then alternately into a second ellipse having its major axis normal to that of the first ellipse. Nodes, or points of no movement, occur at 45° to the axes. When the device is rotated about an axis normal to the plane of the ring, the nodes precess about the ring such that the node positions shift relative to the fixed electrodes, and this shift is detected by a pick-up circuit connected to other electrodes to derive a measure of the rotation, or yaw. A preferred measurement is the yaw rate which is determined by deriving a feedback signal from the tendency of the nodes to shift and applying the feedback to certain electrodes to counter any significant actual shift. In this force-to-rebalance mode the amount of counter force or voltage yields the yaw rate. A yaw rate sensing circuit receives a sensed vibration feedback from the 45° point and produces a sensor output signal which represents the yaw rate.

The ring is driven to resonance by a driving circuit which uses a phase-locked loop and an associated amplitude control loop, both of which receive feedback of sensed vibration amplitude. The amplitude control loop includes a compensator which compares the sensed amplitude to a reference value representing desired amplitude and produces a compensation signal for any variance between sensed and reference values. The drive signal to the ring is modified according to the compensation so that the vibration amplitude is corrected, thereby keeping the variance between sensed and reference values at a very small value.

If a failure causes full or partial loss of vibration amplitude, the variance between sensed and reference values will become large and the compensator will saturate to produce an abnormally large compensation signal. In a first embodiment of the failure detection scheme, a Schmitt trigger coupled to the compensation signal and a threshold signal produces a failure signal when the compensation signal becomes too large. In a second embodiment, a Schmitt trigger coupled to the sensed amplitude value and a threshold somewhat less than the reference value produces a failure signal when the variance between sensed and reference values become large. In both embodiments, a switch arrangement coupled to the sensor output signal is controlled by the failure signal to replace the yaw rate signal with ground potential.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

A yaw sensor or yaw rate sensor is used to detect the turning of an automotive vehicle about its vertical axis, and the information is useful to correct for undesired movement. If the actual turning of the vehicle differs from the desired movement as determined by the steering wheel position, individual braking or driving adjustments, for example, could be used to reduce or eliminate the error. To be acceptable for use in such an application the sensor must be both accurate and economically feasible. It is also required that the sensor include a failure detection capability.

Figure 1:
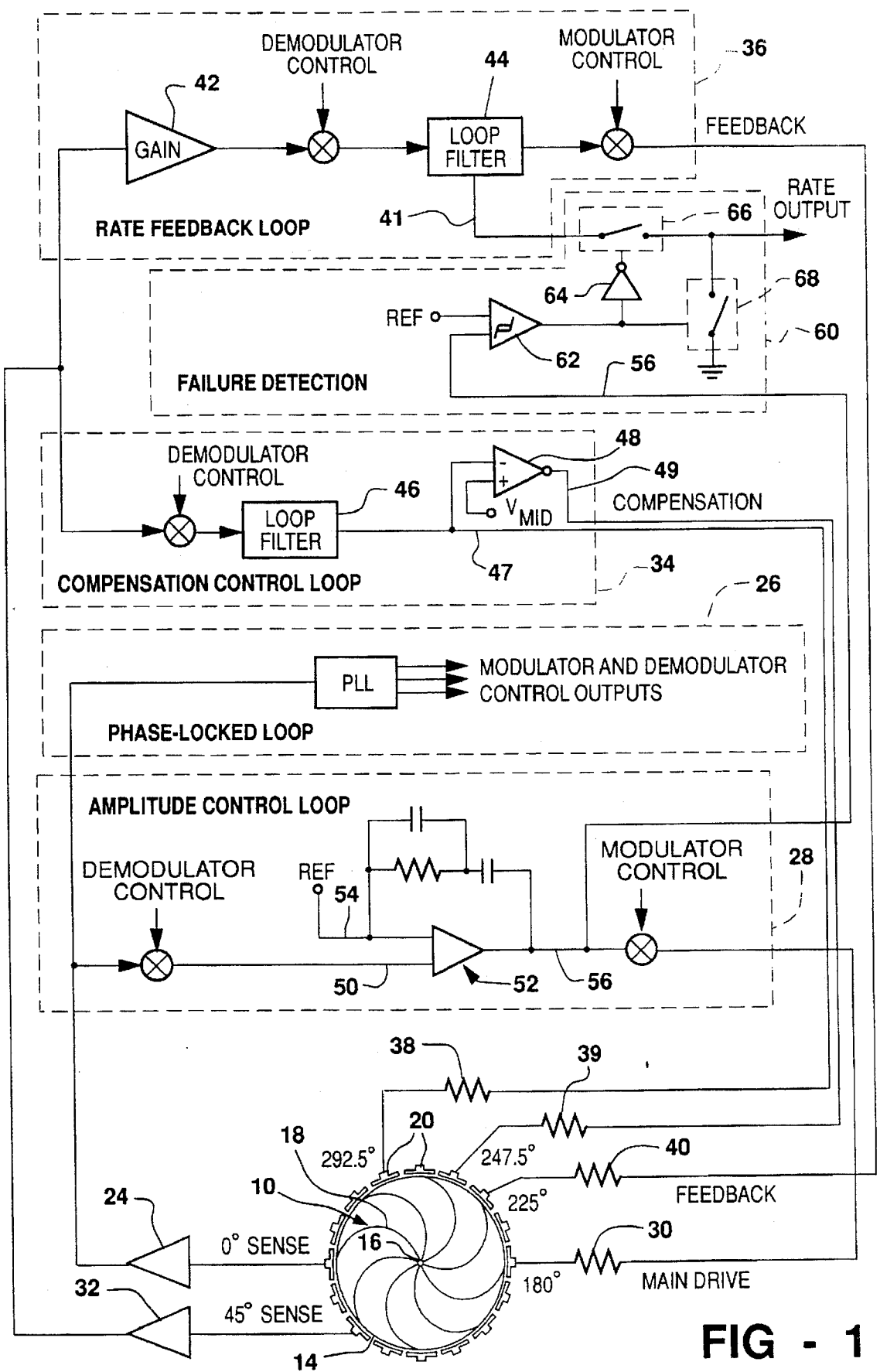
FIG. 1 is a schematic diagram of a yaw rate sensor with failure detection circuitry according to the invention.

Such a yaw or yaw rate sensor is described in the above-mentioned Putty et al paper and is modified according to the present improvement. FIG. 1 illustrates a micromachined vibrational element 10 formed on a silicon substrate. The element 10, which may be metal such as nickel, comprises a ring 14 supported on a hub 16 by a plurality of semi-circular springs 18, the hub 16 extending normally from the substrate surface. A plurality of electrodes 20, also mounted on the substrate surround the ring and are spaced from the ring by a gap to define a capacitive coupling with the ring. Electrical circuits are connected to each electrode and to the element 10 via the hub 16.

The ring 14 is excited into vibration by electrostatic forces applied by imposing square wave voltages on a certain electrode. The excitation forces applied along an x axis alternately force the normally circular ring 14 into an elliptical shape with its major axis on the y axis and then into another elliptical shape with its major axis on the x axis. This vibration mode results in nodes at 45° to the x axis where no ring displacement occurs in the absence of device rotation. If, however, rotation of the sensor occurs about the ring axis normal to the plane of the ring, the vibration pattern precesses such that the nodes shift through an angle related to the amount of sensor rotation. A measurement of the change of vibration angle or the shift of the nodes can then be used to measure the yaw angle. It is preferred to use the device as a yaw rate sensor using a force-to-rebalance technique; then a feedback driving voltage is applied to a certain electrode to prevent the precession, thus maintaining the nodes substantially at their 45° position. The feedback voltage is then a measure of the yaw rate.

An ideal sensing element has a single natural resonance frequency; in practice, slight variations of stiffness or mass in the element causes two natural resonant frequencies to occur. The elements can, as a practical matter, be made such that the resonant frequencies are close together, but the system Q will be somewhat lower than a single frequency device. The element can be tuned or balanced by applying electrostatic forces to the ring which compensate for the physical variations and the result is a single resonance. Such forces are derived by sensing and analyzing the ring vibration and producing a dc voltage which is applied to certain electrodes.

The fundamental vibration amplitude is measured at a 0° position labeled as 0° sense, and vibration due to precession is measured at a 45° electrode position labeled as 45° sense. The 0° sense electrode is coupled through a buffer 24 to a phase-locked loop 26 and an amplitude control loop 28 which supplies the main drive signal. The latter is coupled through resistor 30 to a drive electrode at 180° to complete a closed loop control circuit. The 45° sense electrode is coupled through a buffer 32 to a compensation control loop 34 and to a rate feedback loop 36. The compensation control loop feeds a pair of signals to selected electrodes to tune the element for high Q resonance.

The rate feedback loop 36 derives a yaw rate signal in response to a tendency for precession and feeds back a signal via resistor 40 to a selected electrode to counter the precession. The yaw rate signal on line 41 is the sensor output. In the rate feedback loop 36 the sensed vibration signal is amplified at gain amplifier 42, demodulated, and fed to a loop filter 44. The output of the loop filter 44 on line 41 is the yaw rate and another output is modulated to produce a square wave signal which is coupled via resistor 40 to the 225° electrode. A force is produced by the feedback signal to counter precession, thus substantially restricting ring vibration to the main excitation mode.

The compensation control loop 34 demodulates the sensed vibration and a loop filter 46 produces a dc compensation voltage on line 47 which is applied through a resistor 38 to the 292.5° electrode. A complementary compensation voltage is developed on line 49 by an inverter 48 having the compensation voltage on line 47 as one input and a mid-supply voltage as a reference on the other input. The resultant voltages on lines 47 and 49 are thus equal and opposite with respect to the mid-supply voltage. Line 49 is connected through a resistor 39 to the 247.5° electrode. Although not shown, the lines 47 and 49 are also connected to electrodes diametrically opposed to those at 292.5° and 247.5°. This compensation is capable of resolving two closely spaced resonant frequencies to a single frequency by effectively tuning or balancing the vibrating element 10.

The phase-locked loop 26 receives the main vibration signal and yields a set of modulator and demodulator control outputs which are used in the other circuits to demodulate the sensed input signals and to modulate the output signals.

The amplitude control loop 28 demodulates the 0° sense signal to produce a vibration amplitude signal on line 50. A proportional-integral compensator 52, comprising an operational amplifier with resistive and capacitive feedback, has the amplitude signal on line 50 and an amplitude reference voltage on line 54 as inputs. The output on line 56 is a compensation signal which is modulated to yield a main drive signal which is fed through a resistor 30 to the 180° electrode. This closed loop control maintains the vibration amplitude near the reference value so that normally the signals on lines 50 and 54 will be very close and the compensation signal will vary throughout a limited range according to the required correction.

A failure detection circuit 60 comprises a Schmitt trigger 62 having the compensation signal on line 56 as one input and a reference or threshold voltage as another input. The trigger 62 output is coupled through an inverter 64 to a control terminal of a switch 66 which is serially connected in the sensor output line 41, and the output is also connected to a switch 68 which is connected between the output line 41 and ground. Normally the inverter output holds the switch 66 closed and the switch 68 is open. In the event that a compensation signal occurs which is larger than the threshold voltage the Schmitt trigger output will go high and the inverter output will go low to open the switch 66 and close the switch 68, thereby imposing ground potential on the output line 41 to indicate sensor failure. The hysteresis characteristics of the Schmitt trigger prevent instability or chatter when the compensation signal passes through a threshold.

Figure 2:
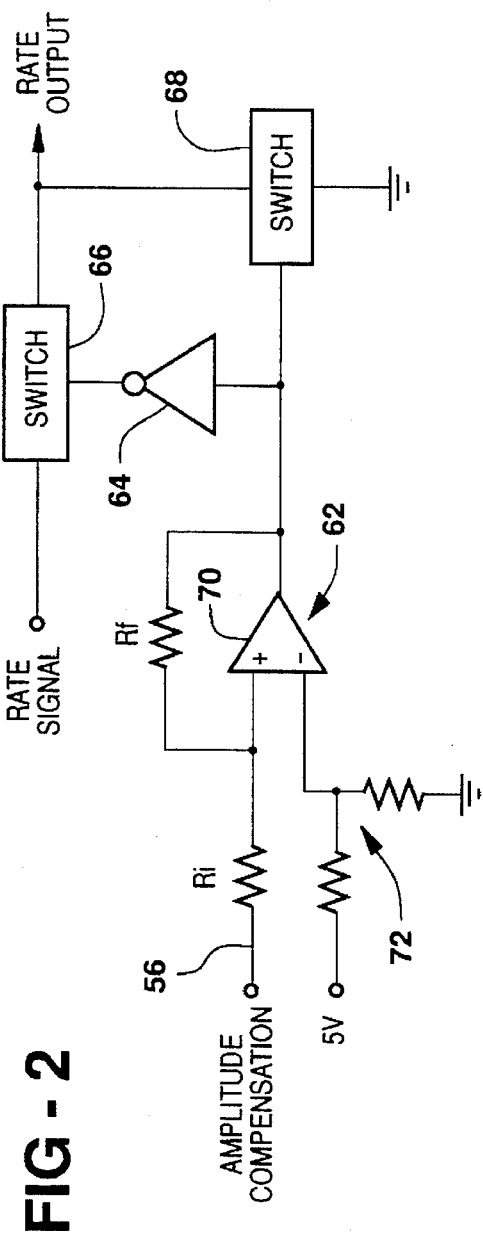
FIG. 2 is a schematic diagram of the failure detection circuit of FIG. 1.

The normal range of the compensator 52 output is up to 4.5 volts. A failure to maintain proper vibration of the ring will drive the output up to substantially 5 volts. As shown in FIG. 2, the Schmitt trigger 62 comprises an operational amplifier 70 having a feedback resistor Rf and an input resistor Ri. The reference voltage of 4.5 v is set by a supply voltage of 5 v fed through a voltage divider 72 having its node connected to an input of the operational amplifier 70. The compensation signal on line 56 is fed through the input resistor Ri to the other amplifier input. At normal compensation voltages the trigger output will be low and the switches will allow the rate signal to pass to become the rate output. When vibration fails for any reason, the compensation signal will exceed the 4.5 volt threshold causing the trigger 62 output to go high and operate the switches to couple the output line to ground.

Figure 3:
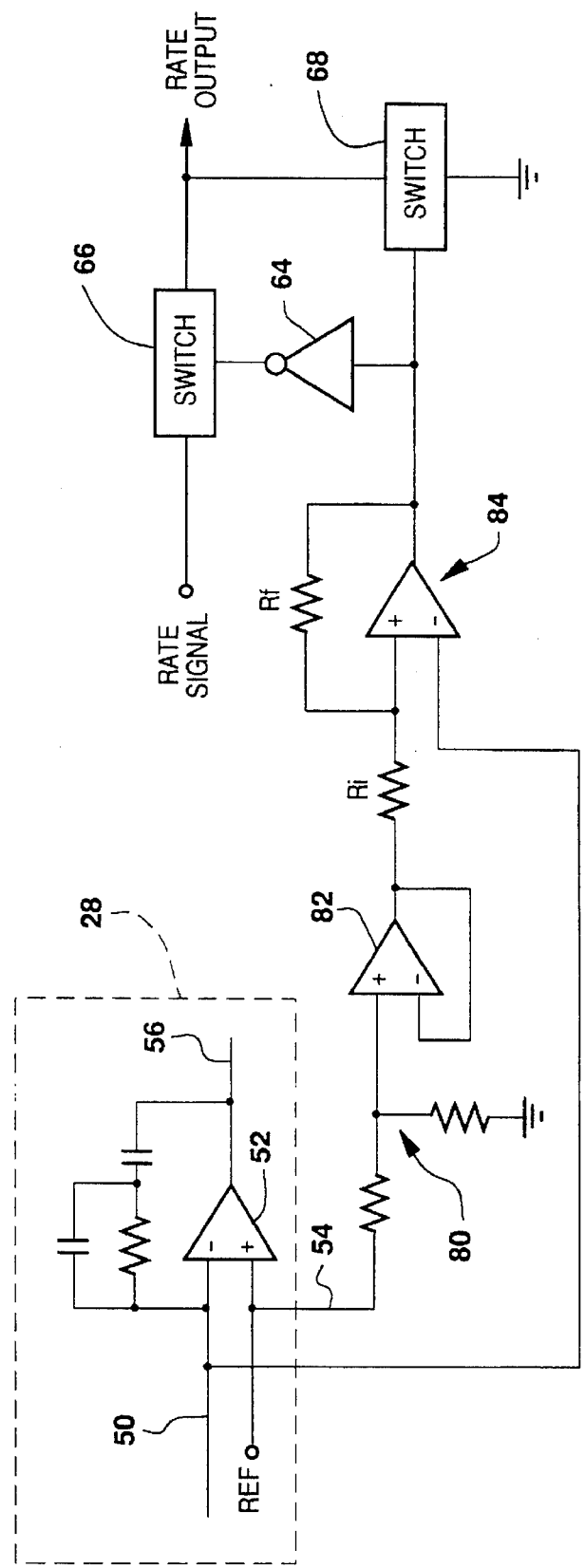
FIG. 3 is a schematic diagram of a second embodiment of the failure detection circuit according to the invention.

As shown in FIG. 3, another approach to detecting vibration failure operates on the input signals to the compensator 52 instead of on the output. The reference voltage on line 54 of the compensator input is connected through a voltage divider 80 to produce another reference which is about 90% of the line 54 voltage. The voltage divider output is connected through a buffer 82 to the input resistor Ri of a Schmitt trigger 84. The amplitude voltage on line 50 is coupled to the inverting terminal of the trigger 84. The remainder of the failure circuit is the same as in FIG. 2. Normally, the vibration amplitude voltage on line 50 is very close to the reference and thus greater than 90% of the reference; then the Schmitt trigger 84 has a low output. When failure occurs, the amplitude voltage drops below 90% of reference, causing the trigger to switch to a high output, and the switches 66 and 68 are operated to substitute the ground potential for the rate output.

It will thus be seen that failure of the vibrating element, of the phase-locked loop or of any other circuit required to maintain vibration will invoke the failure detection circuit.

The embodiments of the invention in which an exclusive property or privilege is claimed are defined as follows:

1. A motion sensor having a failure detection circuit comprising:

a vibrating element;

sense means coupled to said element for producing a feedback signal indicative of actual vibration amplitude of said element;

an output circuit coupled to said element for producing an output signal representing a motion parameter;

a closed-loop drive circuit coupled to the element to maintain vibration of said element at a desired value based on said feedback signal and reference signal indicative of said desired vibration amplitude value, said drive circuit including compensation means for comparing said feedback signal to said reference signal to produce a compensation signal, such that said compensation means is driven into saturation when said vibration element ceases vibrating; and failure detection means for monitoring at least said feedback signal, identifying a failure condition of said sensor as a function of deviation of said feedback signal from said desired value, the failure detection means including means for comparing said compensation signal to a threshold indicative of saturation to detect failure of vibration and providing a failure signal when said failure condition is identified.

2. The invention as defined in claim 1 wherein the failure detection means is coupled to the output circuit and includes means for imposing the failure signal on the output signal.

3. A yaw sensor having a failure detection circuit comprising:

a micromachined ring mounted for vibration and sensitive to yaw motion;

sense means coupled to said ring for producing a feedback signal indicative of actual vibration amplitude of said ring;

an output circuit coupled to said ring for producing an output signal representing a function of yaw;

compensation means responsive to said feedback signal and to a desired amplitude value for exciting the ring to vibration at a desired amplitude including a proportional-integral compensator having sensed and desired amplitude signals as inputs and a compensation signal as an output, wherein the compensator is subject to saturation at large deviation of the signals; and failure detection means coupled to said compensation means for monitoring at least said feedback signal, and identifying a failure condition of said sensor as a function of deviation of said feedback signal from said desired amplitude value including a Schmitt trigger for producing a failure signal when said compensation signal exceeds a threshold to signify saturation of said compensator.

4. A yaw sensor having a failure detection circuit comprising:

a micromachined ring mounted for vibration and sensitive to yaw motion;

sense means coupled to said ring for producing a feedback signal indicative of actual vibration amplitude of said ring;

an output circuit coupled to said ring for producing an output signal representing a function of yaw;

compensation means responsive to said feedback signal and to a desired amplitude value for exciting the ring to vibration at a desired amplitude including a compensator having sensed and desired amplitude signals as inputs and a compensation signal as an output; and failure detection means coupled to said compensation means for monitoring at least said feedback signal, and identifying a failure condition of said sensor as a function of deviation of said feedback signal from said desired amplitude value including a Schmitt trigger having sensed and attenuated desired amplitude signals as inputs for producing a failure signal when sensed amplitude signal becomes smaller than the attenuated desired signal.

* * * * *